US007322377B2

(12) United States Patent
Baltes

(10) Patent No.: US 7,322,377 B2
(45) Date of Patent: Jan. 29, 2008

(54) HYDRAULIC ACCUMULATOR

(75) Inventor: Herbert Baltes, Losheim (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 205 days.

(21) Appl. No.: 10/531,379

(22) PCT Filed: Aug. 1, 2003

(86) PCT No.: PCT/EP03/08517

§ 371 (c)(1),
(2), (4) Date: Apr. 15, 2005

(87) PCT Pub. No.: WO2004/038230

PCT Pub. Date: May 6, 2004

(65) Prior Publication Data

US 2006/0130920 A1 Jun. 22, 2006

(30) Foreign Application Priority Data

Oct. 19, 2002 (DE) ................................ 102 48 823

(51) Int. Cl.
*F16L 55/04* (2006.01)

(52) U.S. Cl. ............................ 138/31; 138/30; 138/26; 277/434; 277/438

(58) Field of Classification Search .................. 138/31, 138/30, 26; 277/434, 438
See application file for complete search history.

(56) References Cited

U.S. PATENT DOCUMENTS

| | | | | |
|---|---|---|---|---|
| 2,715,419 | A * | 8/1955 | Ford et al. | 138/31 |
| 2,748,801 | A | 6/1956 | McCuistion | |
| 3,158,180 | A * | 11/1964 | Greer | 138/31 |
| 3,613,734 | A * | 10/1971 | Elmer | 138/31 |
| 3,863,676 | A * | 2/1975 | Tarsha | 138/31 |
| 3,863,677 | A * | 2/1975 | Tarsha | 138/31 |
| 4,177,837 | A | 12/1979 | Frank et al. | |
| 4,186,777 | A * | 2/1980 | Klope et al. | 138/31 |
| 4,693,276 | A * | 9/1987 | Fulmer | 138/31 |
| 4,878,519 | A * | 11/1989 | Berding et al. | 138/31 |
| 5,024,250 | A * | 6/1991 | Nakamura | 138/31 |

FOREIGN PATENT DOCUMENTS

| | | | |
|---|---|---|---|
| DE | 14 50 347 | A | 3/1969 |
| DE | 19 24 847 | A | 11/1970 |
| DE | 22 22 416 | A | 11/1973 |
| DE | 36 38 640 | A1 | 6/1987 |
| DE | 36 19 457 | A1 | 12/1987 |
| DE | 39 30 556 | A1 | 3/1991 |

* cited by examiner

*Primary Examiner*—Patrick F. Brinson
(74) *Attorney, Agent, or Firm*—Roylance, Abrams, Berdo & Goodman, L.L.P.

(57) ABSTRACT

A hydraulic accumulator includes a piston (3) capable of moving in an accumulator housing (1) in its axial direction and separating a gas side (5) from a liquid side (7) of the accumulator housing (1). Guide elements (9, 17) designed to co-operate with the accumulator housing wall (1), as well as at least one sealing element (15), are arranged at the periphery of the piston. The sealing element is arranged offset in the axial direction relative to the guide elements (9, 17), and is located between the guide elements. In the piston (3), a pressure compensating channel (19) forms, at the piston periphery, a liquid flow path between the liquid side (7) and a space (2) located between the guide element (17) nearest to the liquid side (7) and the sealing element immediately next in the axial direction. A device (25) reducing the cross-section of the passage of the pressure compensating channel (19) is located in it.

7 Claims, 2 Drawing Sheets

HYDRAULIC ACCUMULATOR

FIELD OF THE INVENTION

The present invention relates to a hydraulic accumulator with a piston which can be moved in the accumulator housing in its axial direction and which separates the gas side from the fluid side of the accumulator housing. On the periphery of the piston, guide elements are provided for interaction with the wall of the accumulator housing. At least one sealing element, offset in the axial direction to the guide elements, is located in the peripheral section of the piston situated between the guide elements.

BACKGROUND OF THE INVENTION

Piston accumulators are commercially available and are widely used in hydraulic systems in a variety of applications. For example, they are used for storing energy, emergency actuation, leaking oil compensation, volume compensation, shock absorption, pulsation damping, and the like.

Long-term behavior is of very great importance for economical and reliable use of these accumulators. To guarantee operating behavior which is satisfactory in this regard, it must be ensured that the oil overflow from the fluid side which normally contains hydraulic oil to the gas side is minimized over the entire service life. Current hydraulic accumulators do not meet this requirement to an adequate degree.

DE 14 50 347 A discloses a generic hydraulic accumulator with a piston which can be moved in the accumulator housing in its axial direction and which separates the gas side from the fluid side of the accumulator housing. The periphery of the piston has guide elements that interact with the wall of the accumulator housing, together with at least one sealing element offset in the axial direction to the guide elements. Between the guide element nearest the piston side bordering on the fluid side and the sealing element which is offset in the axial direction to the gas side and which is the next one following in the axial direction, a pressure equalization channel discharges on the periphery of the piston and forms in the piston a fluid path to the fluid side. The pressure equalization channel contains a device which reduces its passage cross-section. In the known solution, the piston is formed from two piston parts which are held at a distance to one another by an energy accumulator in the form of a compression spring and which are routed within the accumulator housing along a common guide rod forming a stop.

Due to the motion of the overall piston within the accumulator housing, there is a pressure difference between the fluid side and the intermediate space which is located on the periphery of the piston between the guide element on the fluid-side end of the piston and the sealing element which follows next in the axial direction. Due to this pressure difference, a volumetric flow into the intermediate space between the guide element and sealing element occurs over the guide element. Entrained dirt particles are deposited in this way between the guide element and the piston. Due to movement of the overall piston, these particles can lead to scratches which adversely affect the system. The described pressure equalization channel eliminates the problem in that when the piston moves, no pressure difference occurs on the guide element and thus a volumetric flow which may be loaded with dirt particles is not produced. In the known solution it is possible that when the piston moves, dirt particles which may have already collected on the inside wall of the accumulator housing are run over in piston movements to damage the piston.

To prevent this problem, the prior art (DE 36 19 457 A) suggested a cylindrical hydraulic accumulator for hydraulic systems, having an accumulator housing cylinder closed on its two faces. A floating piston in the housing cylinder divides the cylinder into two spaces. Towards its seal against the inside cylinder wall on the two ends of its outside wall, the piston has one recess each. In one recess, a respective groove-packing ring of elastomer is arranged, such that its annular groove is pointed toward the pertinent piston face. However, this measure is not sufficient for effectively deterring dirt particles. The known groove-packing rings each have in cross-section a tetragonal profile sectional area which undergoes transition toward the pertinent face of the piston into a U-shaped profile cross-sectional area. The U-shaped profile cross-sectional area projects radially over the tetragonal profile cross-sectional area as a plain compression ring. The tetragonal profile cross-sectional area in its entire width is enclosed by a support ring of a high-strength material, preferably of a carbon fiber winding bonded in resin, with an outer surface which adjoins the inside cylinder wall, sliding almost without play. In the U-profile area which is left clear, dirt can collect which can adversely affect the sealing function. The projecting angular stripper edge of the seal, which edge is configured to be solid, is designed too stiffly for an effective sealing and stripping function.

SUMMARY OF THE INVENTION

An object of the present invention is to provide an improved hydraulic accumulator with a pressure equalization channel in the piston such that improved long-term operating behavior can be achieved.

In a hydraulic accumulator with a pressure equalization channel in the piston, this object is achieved according to the present invention in that the guide element nearest the fluid side of the piston is located closely adjacent to the fluid-side end of the piston and is formed by a guide belt with a dirt stripper lip which extends at least approximately to the end of the piston. The guide belt has a plain compression ring which sits in an annular groove of the piston periphery with a dirt stripper lip which lengthens its radially outside annular surface on one side in the axial direction and which tapers towards its end edge. The piston in the peripheral area which extends from the fluid-side end to the annular groove has a section of reduced outside diameter over which the dirt stripper lip extends. In this way, dirt particles which may have already collected on the inside wall of the accumulator housing are prevented with certainty from being run over when the piston moves. The stripper lip of the plain compression ring in particular also contributes to this prevention. The stripper lip extends tapering to the outside and, located in the area of the piston end, extends preferably over an axial length which is somewhat larger than half the axial length of the plain compression ring.

The device which reduces the passage cross-section of the pressure equalization channel ensures that only a small fluid volume is involved in the process of pressure equalization.

The device which causes a reduction of the passage cross-section of the pressure equalization channel preferably reduces the passage cross-section so dramatically that as a result of the narrowing of the cross-section the action of a particle filter arises. Even a minimum volumetric flow through the pressure equalization channel, as arises for pressure equalization during movements, does not lead to transport of dirt particles into the intermediate space which is located downstream of the guide element on the periphery of the piston.

The device which reduces the passage cross-section can be a choke device, for example a nozzle which is inserted into the pressure equalization channel, with a correspondingly small nozzle opening which acts as a particle filter.

Instead of a choking nozzle as the device which narrows the cross-section, a porous filter element can be inserted into the pressure equalization channel.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
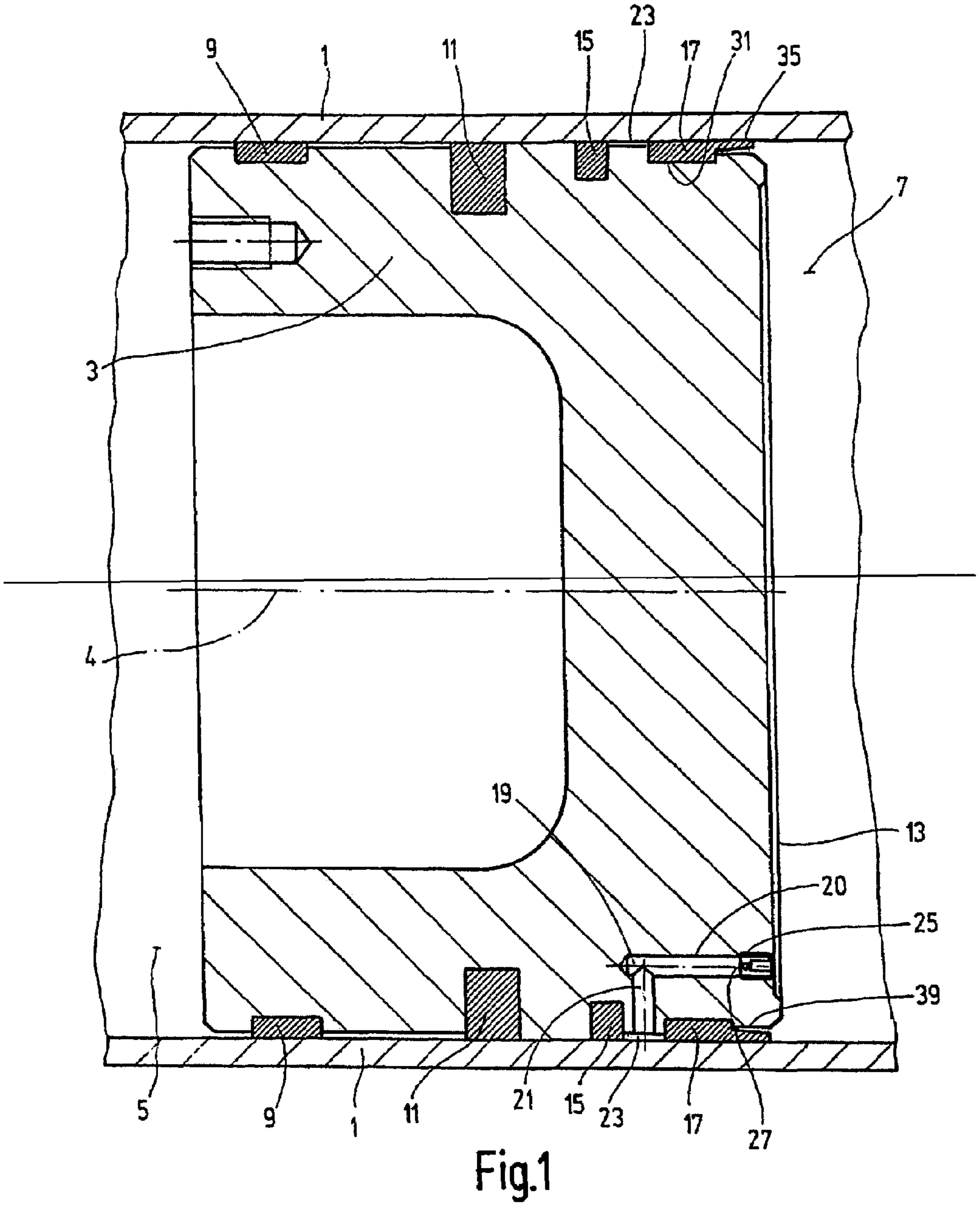
FIG. 1 is a side elevational view in longitudinal section of a piston accumulator according to one exemplary embodiment of the present invention, where the section of the accumulator housing being shown is in which the piston is located.

The exemplary embodiment of the hydraulic accumulator according to the present invention is in the form of a piston accumulator. FIG. 1 shows only the section of the accumulator housing 1 in which the piston 3 is located. It forms a separating element which can move in the axial direction, i.e., along the longitudinal axis 4, between the gas side 5 and the fluid side 7 of the accumulator housing 1.

In hydraulic accumulators incorporated into hydraulic systems, the gas side 5 is conventionally filled with nitrogen gas, while the fluid side 7 in operation conventionally contains hydraulic oil. The sealing and guidance system acts between the periphery of the piston 3 and the inside wall of the accumulator housing 1, prevents overflow of media from one piston side to the other piston side, and forms a piston guide when the piston 3 is moving. Such system has a plurality of components provided on the periphery of the piston 3. In succession, in FIG. 1 in the axial direction from left to right, the components are a guide element which is adjacent to the fluid-side end of the piston 3 in the form of a guide belt 9, a first piston seal 11 which is located at an axial distance from guide belt 9 approximately in the central area of the piston 3, a second piston seal 15 which is further offset relative to the first piston seal in the axial direction toward the fluid-side end 13 of the piston 3, and a guide element which is still further offset toward the end 13 of the piston 3 in the form of a guide belt 17.

As seen in the lower part of FIG. 1, a pressure equalization channel 19 is in piston 3, and is formed from two blind holes which undergo transition into one another. One blind hole 20 proceeds from the end 13 of the piston 3, and extends parallel to the longitudinal axis 4. The other blind hole 21 extends at a right angle to blind hole 20, and proceeds from the periphery of the piston 3. Blind hole 21 on the periphery of the piston discharges into an intermediate space 23 located between the guide belt 17 and the piston seal 15 extending therebetween in the axial direction.

As a result of hydrodynamic circumstances, in operation when the piston 3 moves a pressure difference arises between the space 23 and the pressure of the hydraulic oil located on the fluid side 7. This pressure difference in the absence of a pressure equalization channel 19 leads to a slight volumetric flow over the guide belt 17. As already mentioned, entrained particles deposited between the inside wall of the housing 1 and the piston 3 can lead to disruptions of the sealing and guidance system. The pressure equalization channel 19 of the present invention avoids the formation of a corresponding pressure difference, and thus, the corresponding oil overflow.

To preclude the danger of a fluid flow, which occurs in the pressure equalization channel 19 during the process of pressure equalization and which is able to cause particles to be brought into the space 23, the present invention provides a narrowing of the passage cross-section of the channel 19.

In the embodiment shown in FIG. 1, this device is formed by a nozzle 25 inserted into the mouth of the hole 20 of the channel 19 on the end 13 of the piston 3. The nozzle hole 27 is chosen to be of such small dimension here that it acts as a particle filter so that no particles which have a dimension greater than that of the hole 27 can travel into the space 23 by way of the channel 19.

Instead of using a nozzle hole 27 of correspondingly small dimensions as a particle filter, a filter element could be inserted into the pressure equalization channel 19, preferably in its hole 20.

Figure 2:
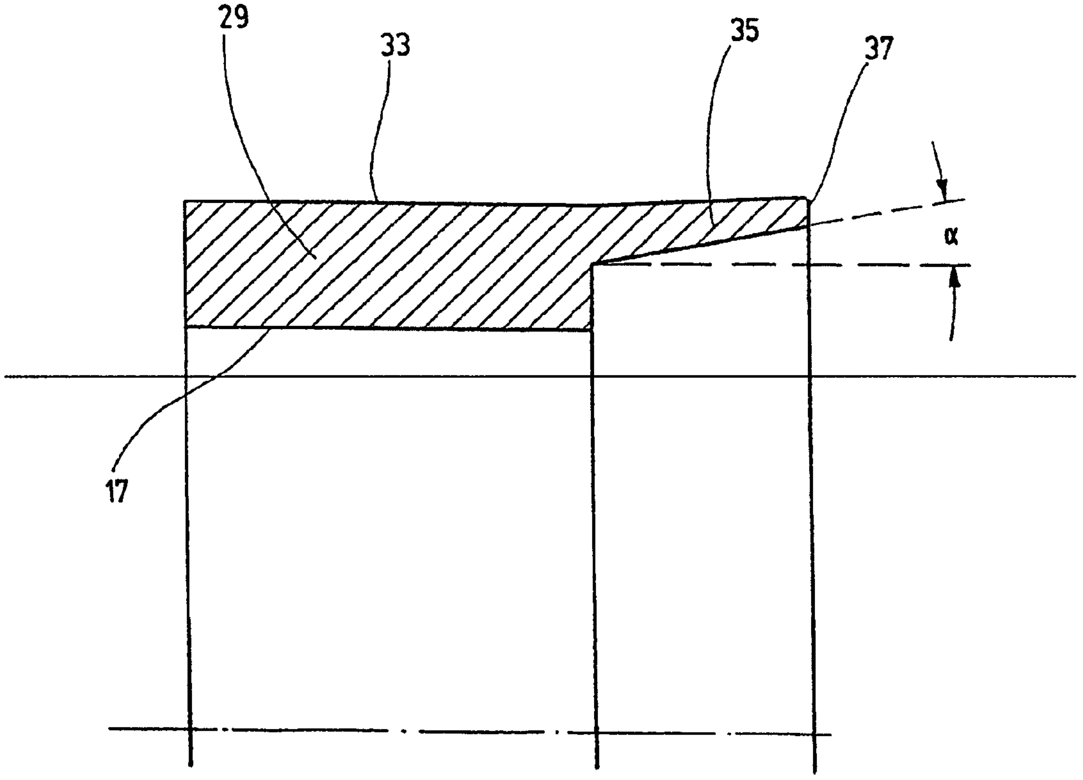
FIG. 2 is a partial side elevational view in longitudinal section of a piston guide element of the exemplary embodiment of FIG. 1, which section is drawn with a highly enlarged scale compared to FIG. 1, in the form of a plain compression ring with a projecting dirt stripper lip.

To avoid the further danger of adversely affecting the sealing and guidance system, which could occur due to dirt particles which have already collected on the inside wall of the housing 1, the guide belt 17 is made additionally as a stripper element with a structure shown particularly in FIG. 2. As shown, the base part of the guide belt 17 performs the function of the piston guide in interaction with the inside wall of the housing 1, and has a plain compression ring 29 supported in an annular groove 31 machined into the periphery of the piston 3. The outer annular surface 33 of the plain compression ring 29 forms the guide surface, and is lengthened in the axial direction to form the stripper lip 35. The stripper lip extends over an axial length somewhat greater than half the axial length of the plain compression ring 29 (FIG. 2). As is likewise clearly seen from FIG. 2, the lip 35 tapers, proceeding from its root on the plain compression ring 29, as far as the end edge 37 with a tapering angle $\alpha$. In the example shown, the angle is approximately 10 degrees relative to the axial direction. As is likewise seen from FIG. 2, the radial thickness of the lip 35 on its root bordering the plain compression ring 29 is somewhat less than half the radial thickness of the plain compression ring 29.

In the guidance and stripper element which forms the guide belt 17, the plain compression ring 29 and the stripper lip 35 are formed integrally of an elastomer material so that the plain compression ring 29 can be snapped into the annular groove 31 on the piston 3 and the lip 35 extends projecting in a flexible manner. As seen in FIG. 1, the lip 35 extends over the end-side peripheral section 39 of the piston 3. This section extends into the area of the fluid-side end 13, and is somewhat reduced in outside diameter. Due to the intermediate space formed in the section 39 between the piston 3 and the lip 35, lip 35 can be conformed in an elastically flexible manner to the inside wall of the housing 1, by means of which the lip 35 achieves an optimum stripper action.

Efficient operating behavior can be ensured over a very long service life by the configuration of the guidance and sealing system provided in the present invention. The pressure equalization between the space 23 on the piston periphery and the fluid side 7 and the measures provided combine to prevent settling of dirt particles on the inside wall of the housing 1.

The guide belt 9 is shown on the left as viewed in FIG. 1 can be designed comparably to the guide belt 17 shown on the right and/or can be replaced by it.

While one embodiment has been chosen to illustrate the invention, it will be understood by those skilled in the art that various changes and modifications can be made therein without departing from the scope of the invention as defined in the appended claims.

What is claimed is:

1. A hydraulic accumulator, comprising:

an accumulator housing extending along a longitudinal axis and having a gas side, a fluid side and a side wall;

a piston being movable in said housing along said longitudinal axis, separating said gas side and said fluid side, and having an annular groove on a periphery thereof and a reduced outside diameter section extending from said annular groove at an end of said piston adjacent said fluid side;

first and second guide elements on said periphery of said piston interacting with said side wall of said housing and located adjacent said gas side and said fluid side, respectively, said second guide element being a guide belt with a dirt stripper lip extending at least approximately to an end of said piston and with a plain compression ring sitting in said annular groove, said dirt stripper lip lengthening a radially outside surface of said guide belt on one axial end thereof in an axial direction, tapering toward a free end thereof at a 10° angle relative to said longitudinal axis and extending over said reduced outside diameter section, said compression ring being rectangular in transverse cross-section, said dirt stripper lip having a root adjacent said compression ring with a thickness less than one-half a radial thickness of said compression ring;

at least one sealing element offset in an axial direction on said periphery of said piston from said gas side and being spaced from and between said guide elements;

a pressure equalization channel opening on said periphery of said piston between said second guide element and said sealing element, opening on an axial end of said piston on said fluid side, and providing fluid communication therebetween; and a device in said equalization channel reducing a cross-sectional area thereof.

2. A hydraulic accumulator according to claim 1 wherein said device acts as a particle filter by dramatically or substantially reducing said cross section of said pressure equalization channel.

3. A hydraulic accumulator according to claim 2 wherein said device is a choke.

4. A hydraulic accumulator according to claim 3 wherein said choke has a nozzle.

5. A hydraulic accumulator according to claim 4 wherein said nozzle is adjacent a piston side at said fluid side, and is inserted into a mouth of said pressure equalization channel.

6. A hydraulic accumulator according to claim 3 wherein said choke is a porous filter element.

7. A hydraulic accumulator according to claim 1 wherein said compression ring and said dirt stripper lip are integrally formed of elastic material.

* * * * *